United States Patent Office 2,847,435
Patented Aug. 12, 1958

2,847,435
CARBOXYLATED CYCLODIENE DERIVATIVES

Herbert K. Wiese, Cranford, and Ober C. Slotterbeck, Rahway, N. J., assignors to Esso Research and Engineering Company, a corporation of Delaware No Drawing. Application April 1, 1955
Serial No. 498,748

14 Claims. (Cl. 260—429)

This invention relates to monobasic cyclodiene acid derivatives such as polycyclodiene monocarboxylic acids and their preparation. More particularly it relates to monobasic acid compounds derived by reacting or crosspolymerizing a dibasic acid dimer such as dicyclopentadiene dicarboxylic acid, dimethyldicyclopentadiene dicarboxylic acid, or the like with reactive dienophilic compounds such as monomers or dimers of cyclopentadiene, or hexachlorocyclopentadiene, and the like.

Dicyclodiene dicarboxylic acids and their preparation have been described previously in copending application of Cohen et al., Serial No. 268,122, filed January 24, 1952, issued as Patent No. 2,716,662, and re-issued as Reissue Patent 24,123. Such acids are in effect dimers of the corresponding monocyclodiene monocarboxylic acids. However, so far it has been found impossible to isolate the monomer acids, though such monocarboxylic acids would be highly desirable for purposes of producing polymers or copolymers with other unsaturated monomers, or for producing derivatives thereof.

It has now been discovered that very useful monobasic acids can be derived from the dimer acids by cross-polymerizing the latter with suitable dienophilic compounds or monomers. More particularly, it has been discovered that the dimer acids depolymerize surprisingly readily and that, while the monomer acid cannot be isolated as such, it can be converted into an isolatable monobasic acid compound without much difficulty. Still more specifically, it has been found that while the dimer acids can be readily depolymerized, the equilibrium of the resulting mixture heavily favors the dibasic acid dimer. However, when another reactive compound such as cyclopentadiene is added to such a mixture, the added compound will react with the monomer acid present and thus form a stable monomer acid derivative. As a result of this discovery it has thus become possible to form valuable reactive adducts of unisolatable monomers by supplying the latter to the reaction in the form of dimers. The resulting adducts are valuable as a source of synthetic naphthenic acids possessing a high degree of reactivity. Their salts of metals such as manganese, cobalt or lead, either as such or upon hydrogenation, can be used as paint driers. Furthermore, chlorinated monocarboxylic acid derivatives as such, or esters thereof such as the methyl ester, or in the form of calcium, copper, mercury, lead, arsenic or other salts can be used as fungicides, herbicides, and insecticides.

In carrying out the present invention, the principal reagent is a dicyclodiene dicarboxylic acid such as dicyclopentadiene dicarboxylic acid which may be represented by the formula:

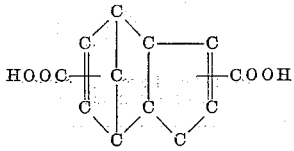

Another dicarboxylated dicyclodiene compound suitable for the present purposes is dimethyl dicyclopentadiene dicarboxylic acid, i. e., the dicarboxylated dimer of methylcyclopentadiene. As stated above, these dimeric compounds normally exist in equilibrium with the corresponding monomeric acid, but usually the amount of monomer is small and all but impossible to isolate as such.

The other essential ingredient of the present invention, which involves a Diels-Alder type reaction, is a reactive dienophilic cyclodiene such as cyclopentadiene, dicyclopentadiene, methyl cyclopentadiene, dimethyldicyclopentadiene, hexachlorocyclopentadiene, and the like. As is well-known in a general manner, in a Diels-Alder type reaction two addenda or types of monomers take part in the reaction: a diene component with at least two conjugated double bonds, and a co-reactant called a dienophile which has at least one multiple bond.

Thus, for instance, when dicyclopentadiene dicarboxylic acid is reacted with cyclopentadiene, a polycyclopentadiene monocarboxylic acid is produced which may be represented by the following formula:

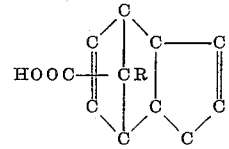

More generally speaking, by reacting an appropriate dicyclodiene dicarboxylic acid with a cyclodiene monomer or dimer or a halogenated cyclodiene monomer a polycyclodiene monocarboxylic acid which may be represented by one of the following structures can be obtained:

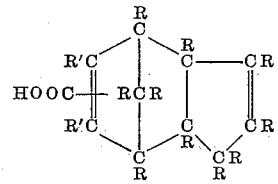

and

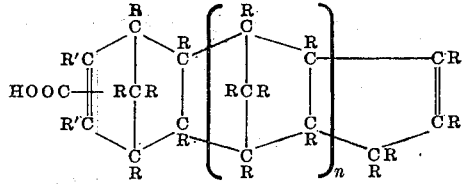

In the above formulas R and R' may stand for hydrogen, chlorine, bromine, iodine, fluorine or alkyl groups of 1 to 4 carbon atoms such as methyl, ethyl, propyl or butyl, it being understood that the several R and R' substituents of a given compound may either be all of a kind or they may be different, it being further understood that the shown carboxyl group will replace one of the R' groups; and $n$ represents an integer ranging from 1 to 4. The following specific compounds are illustrative of the products falling within the scope of this invention:

Dicyclopentadiene monocarboxylic acid
Dimethyltricyclopentadiene monocarboxylic acid
Methyldicyclopentadiene monocarboxylic acid
Dimethyldicyclopentadiene monocarboxylic acid
Hexachlorodicyclopentadiene monocarboxylic acid
Tricyclopentadiene monocarboxylic acid
Tetracyclopentadiene monocarboxylic acid
Dimethyltricyclopentadiene monocarboxylic acid
Hexamethylhexacyclopentadiene monocarboxylic acid The reaction is carried out at temperatures sufficient to cause the dimer acid to crack or dissociate into its monomer. Suitable temperatures usually fall in the range of about 75 to 250° C., preferably 135–190° C. At temperature below about 100° C. the reaction tends to be quite slow due to the slow rate of monomer acid formed, whereas at temperatures above 190° C. decarboxylation of the dicyclodiene dicarboxylic acid and resinification tend to become increasingly prevalent. The pressure depends on the dienophilic compound used and temperature at which the reaction is carried out. Accordingly, the reaction may be conducted at pressures ranging from atmospheric or slightly subatmospheric to moderately elevated pressures such as 10 or 50 p. s. i. g. At least two moles of the dienophilic monomer for every mole of dibasic acid should be employed. However, an excess of the dienophilic compound is generally preferred in order to obtain the optimum yield of the desired product. For instance, a reaction mixture containing the equivalent of about 5 to 10 moles of cyclodiene monomer per mole of dibasic acid is especially convenient to work with. The progress of the reaction is easily followed since the dibasic acid is insoluble in the dienophilic cyclodiene whereas the monobasic acid adduct is soluble in the excess of the cyclodiene present.

Several illustrative examples of the invention will now be given.

EXAMPLES

The reactions, for example, with dicyclopentadiene dicarboxylic acid, hereafter referred to as DCPDA, and

*Table I*

REACTION OF DICYCLOPENTADIENE DICARBOXYLIC ACID WITH VARIOUS DIENOPHILIC COMPOUNDS

| Run No. | 1 | 2 | 3 |
|---|---|---|---|
| Charge, gm: | | | |
| DCPDA [a] | 30 | 20 | 10. |
| Dienophilic Compound Used | DCP | DMDCP | $Cl_6CP$. |
| Weight of Dienophilic Compound | 150 | 90 | 37. |
| Solvent, ml | none | none | tetralin (25 ml.). |
| Conditions: | | | |
| Max. Temp., °C | 140 | 170–175 | 160. |
| Time to Reach Max. Temp., min | 15 | 20 | |
| Time at Max. Temp., min | 90 | 10 | 30. |
| Yield, Mole Percent Based on DCPDA. | 85.5 [e] | 100 | 99. |
| Analysis on Product: | | | |
| Acid No., meq./gm | 5.22 (5.68) [b] | 4.79 (5.26) [c] | 2.59 (2.61) [d]. |
| Molecular Weight | 188 (176) [b] | 210 (190) [c] | 375 (382.7) [d]. |
| Melting Point, °C | Viscous Liquid | Viscous Liquid | 180–193. |

[a] Dicyclopentadiene dicarboxylic acid.
[b] Figure in parentheses represents theoretical value for dicyclopentadiene monocarboxylic acid.
[c] Figure in parentheses represents theoretical value for methyldicyclopentadiene monocarboxylic acid.
[d] Figure in parentheses represents theoretical value for hexachlorodicyclopentadiene monocarboxylic acid.
[e] Yield low due to loss of some product during work up.

*Table II*

| Run No. | Dienophilic Compound | Temp. of Reaction, °C | Approximate Mole Percent Yield based on Dicyclopentadiene Dicarboxylic Acid | Monocarboxylic Acid Obtained |
|---|---|---|---|---|
| 1 | dimer of cyclopentadiene. | 140 | 85 | 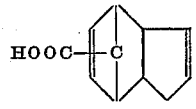 Dicyclopentadiene monocarboxylic acid  Ca.70% [a] 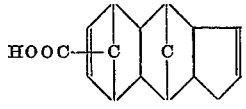 Tricyclopentadiene monocarboxylic acid  Ca.30% [a] |
| 2 | dimer of methylcyclopentadiene. | 170–175 | 100 | 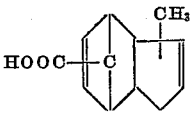 Methyldicyclopentadiene monocarboxylic acid  Ca.70% [a] 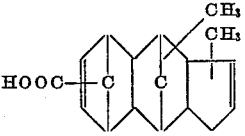 Dimethyltricyclopentadiene monocarboxylic acid  Ca.30% [a] |
| 3 | hexachlorocyclopentadiene. | 160 | 99 | 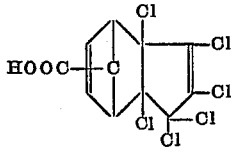 Hexachlorodicyclopentadiene monocarboxylic acid |

[a] Distribution based on acid numbers shown in Table I.

various dienophilic cyclodiene compounds were carried out by heating the dibasic acid with an excess of the dienophilic compound at temperatures ranging from 140–175° C. The reaction product was isolated by dissolving the acidic material in dilute aqueous potassium carbonate followed by extracting the unreacted material with petroleum ether. The desired product was recovered from the aqueous solution by acidifying with dilute sulfuric acid. In the runs made with cyclopentadiene (CP) and methylcyclopentadiene (MCP) the corresponding dimers (DCP and DMDCP) were employed. Under the conditions of the reaction the dimers cracked to the monomers which in turn reacted with cyclopentadiene monocarboxylic acid monomer as it was produced from the depolymerization of the dicyclopentadiene dicarboxylic acid.

In run No. 3 monomeric hexachlorocyclopentadiene ($Cl_6CP$) was used as the dienophilic reagent. In Tables I and II are summarized the conditions, analysis of products and type of products obtained.

The above data show that the present invention is unusually effective in the production of high yields of a novel kind of monobasic acid. As explained before, the acid is useful as such, or it may be converted into esters or metal salts.

Having indicated the general nature, spirit and operation of the invention and illustrated it in terms of specific embodiments, it will be understood that the invention is not limited thereto. On the contrary, the ultimate scope of the invention is particularly pointed out in the appended claims.

What is claimed is:

1. A process for preparing a monobasic acid which comprises mixing a polycyclodiene dibasic acid with a dianophilic cyclodiene selected from the group consisting of cyclopentadiene, methylcyclopentadiene, hexachlorocyclopentadiene, dicyclopentadiene, dimethyldicyclopentadiene and heating the mixture at a temperature sufficient to cause depolymerization of the dibasic acid.

2. A process according to claim 1 wherein the dibasic acid is a dicarboxylated dicyclopentadiene.

3. A process according to claim 2 wherein the dibasic acid is dicarboxylated dimethyldicyclopentadiene.

4. A process for preparing a monobasic acid compound which comprises mixing dicyclopentadiene dicarboxylic acid with an excess of hexachlorocyclopentadiene and heating the mixture between about 135° and 190° C.

5. A process according to claim 4 wherein the reaction mixture comprises tetralin as a solvent.

6. A process for preparing a monobasic acid compound which comprises mixing a dicyclopentadiene dicarboxylic acid with a dimer of a cyclopentadiene hydrocarbon and heating the mixture at a temperature between about 75° and 250° C.

7. A polycyclopentadiene monocarboxylic acid having no more than six cyclopentadiene monomers.

8. A dicyclopentadiene monocarboxylic acid.

9. Dicyclopentadiene monocarboxylic acid.

10. Methyldicyclopentadiene monocarboxylic acid.

11. Hexachlorodicyclopentadiene monocarboxylic acid.

12. The methyl ester of a dicyclopentadiene monocarboxylic acid.

13. A metal salt of a dicyclopentadiene monocarboxylic acid wherein the metal is selected from the group consisting of manganese, cobalt, lead, calcium, copper, mercury, and arsenic.

14. A dicyclopentadiene monocarboxylic acid represented by the formula:

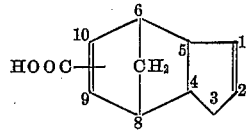

wherein the COOH group is attached to a carbon atom selected from the 9 and 10 carbon atoms.

References Cited in the file of this patent

UNITED STATES PATENTS 2,688,627    Cohen _____ Sept. 7, 1954